United States Patent [19]
Pruvot et al.

[11] 4,249,431
[45] Feb. 10, 1981

[54] PLANETARY SPEED REDUCER WITH DEFORMABLE RING

[75] Inventors: François D. Pruvot, Lausanne; Yvonnick P. Chesnel, Guyancourt, both of France

[73] Assignee: Regie Nationale des Usines Renault, Boulogne-Billancourt, France

[21] Appl. No.: 883,234

[22] Filed: Mar. 3, 1978

[30] Foreign Application Priority Data

Mar. 3, 1977 [FR] France .............................. 7706236

[51] Int. Cl.³ .......................... F16H 3/44; F16H 1/28; F16H 57/00
[52] U.S. Cl. ........................................ 74/785; 74/410; 74/801
[58] Field of Search .......................... 74/801, 410, 785

[56] References Cited

U.S. PATENT DOCUMENTS

| | | | |
|---|---|---|---|
| 2,591,734 | 4/1952 | Smith et al. | 74/801 |
| 3,011,365 | 12/1961 | Stoeckricht | 74/801 |
| 3,021,731 | 2/1962 | Stoeckicht | 74/801 |
| 3,459,072 | 8/1969 | Shannon | 74/801 |
| 3,757,608 | 9/1973 | Willner | 74/801 |
| 4,096,769 | 6/1978 | Horikiri et al. | 74/801 |

FOREIGN PATENT DOCUMENTS

890697  2/1944  France .

*Primary Examiner*—Leslie Braun
*Attorney, Agent, or Firm*—Oblon, Fisher, Spivak, McClelland & Maier

[57] ABSTRACT

The reducer includes a motor, an input shaft furnished with a ring gear meshing with a number of planet gears, the shafts of which are integral with a plate itself mounted on an output shaft. The planet gears are located inside a deformable annulus of thin steel reinforced outside by a thick, and thus very rigid ring.

14 Claims, 5 Drawing Figures

PLANETARY SPEED REDUCER WITH DEFORMABLE RING

BACKGROUND OF THE INVENTION

1. Field of the Invention:

The present invention relates to an arrangement for transmission of motion. It concerns more particularly the field of speed reducers in which the high speed motion of an input shaft is transformed to low speed of an output shaft by means of systems of shafts and gears.

2. Description of the Prior Art:

Speed reducers may constitute independent mechanical devices and may also be included in more complex mechanisms. In general they are formed by the association of a shaft carrying a pinion with a small number of teeth engaging a pinion with a larger number of teeth carried on a second shaft, which also carries a pinion with a small number of teeth which engages in turn a pinion with a larger number of teeth carried by a third shaft and so forth, the number of shafts and pinions being a function of the speed-reduction ratio desired.

The main drawback of such reducers is their bulkiness. This is due to the fact that the interior volume of the reducer is poorly utilized because of the spacing required between the driving and driven gears. Another reason for this bulkiness is the fact that there are unavoidable flexure forces on the various shafts; these must therefore be very large in diameter and supported by large bearings.

In order to save space, planetary gear reducers are often used. They are characterized by the fact that they can have several "planets" driven by a single "sun". The planet wheels being evenly spaced around the sun wheel, the flexure forces on the input shaft are zero and, consequently, it can have a small-diameter shaft and low-capacity bearings. The same is true of the output shaft. Moreover, the planet wheels being disposed concentrically with the drive gear, which itself is concentric with the annulus, in most designs, reducers with planetary trains are very compact.

Some well-known designs permit the realization of very large reduction ratios with a small number of gears. These trains have four disadvantages: first, they require great precision in construction so that all planet wheels participate in transmission. If the precision is insufficient, just one will carry the load, and this diminishes considerably the load capacity of the reducer and, consequently, removes all its attractiveness. Next, particularly in reducers with large reduction, internal clearances and especially those between gear teeth may result in a large angular play between the input and output shafts. Decrease of these clearances leads to a considerable increase in the cost of the reducer but may still not be very effective in most cases.

It can also be shown that in certain types of epicyclic reducers there is a "recirculating" power which would not be troublesome in itself if the energy losses of the reducer were not proportional to the actual delivered power. Now, such is not the case and for certain configurations this "recirculating" power is much greater than the actual power. Consequently the losses are elevated and the efficiency of the reducer is low. Finally, certain configurations, unfortunately those with high reduction ratios, lead necessarily to a high drive-shaft inertia. This inertia is referred to the output shaft.

As is well-known, the inertia reflected to the output shaft is equal to the drive shaft inertia multiplied by the square of the reduction ratio. A very important consequence of this is that, if the reducer drives a mechanism that can be accidentally blocked, the kinetic energy of the input shaft is such that it can not be absorbed by an elastic deformation of the elements "downstream". There then occurs a plastic deformation or rupture and therefore destruction of the reducer and/or the driven mechanism. Also known are reducers called "deformation wave" reducers (in English: "strain wave" gearing) in which one makes use of the elastic deformation of a "bell" with a given number of teeth on its periphery which is constrained by an elliptical ball bearing situated at its center to mesh with a fixed annulus having on its inner cylindrical surface a larger number of teeth than the "bell". The result is a relative motion with a high speed ratio between the input shaft, which drives the inner elliptical race of the ball bearing, and the output shaft which is driven by the bell. Moreover, this high ratio is obtained with just two toothed parts.

At first sight, then, this reducer seems very attractive. Several drawbacks prevent its use in many cases. First, it has low torsional rigidity so that the bandpass of a machine using it is very often isufficient. This lack of rigidity cannot be compensated since it is a consequence of the very principle used in the device. It is due to, among other things, the elastic compression of the balls of the elliptical bearing between the races and also to their play. Another important drawback is the high cost of the reducer, mainly for the elliptical ball bearing.

Finally, its principal disadvantage is the enormous primary inertia of the input shaft which drives the inner race, necessarily of large diameter, of the elliptical bearing. The result of this primary inertia is to limit accelerations of the input shaft and also to make unavoidable the destruction of the reducer and/or the driven device in case of sudden stoppage of the latter.

There are different versions of these "deformation wave" reducers. In some the elliptical bearing, and thus its drawbacks, has been eliminated, but none reduce the primary inertia significantly. It must be said that all these reducers are reasonably compact, although less so than the standard epicyclic reducers, and their operating clearances are rather small.

Finally, numerous other types of reducers are known but all have one or more of the disadvantages noted above. The present invention permits avoiding these drawbacks.

The improved speed reducer of the present invention is remarkable in that its input shaft carries a gear which drives a minimum of two and at most three planet wheels which, in turn, drive a single deformable annulus with an axis concentric with the axis of the input shaft, the teeth of the gear having a primitive diameter less than the diameter of the circle circumscribed around the set of the planet wheels in operating position and meshing without play with the teeth of the input shaft, the difference between these two diameters being at least sufficient for the meshing to be without play for the entire life of the speed reducer.

According to a first embodiment of the invention there is mounted around the deformable annulus a rigid ring the inner diameter of which is greater by some hundredths of a millimeter than the diameter of the circle circumscribed about the deformable annulus after it has been mounted around the planet wheels surrounding the input shaft.

According to a second embodiment of the invention, the rigid ring is mounted floatingly around the deformable annulus and its axial displacement is limited on one side by a shoulder on the housing and on the other by a brace.

According to another embodiment of the invention, the input shaft, the planet wheels and the deformable annulus form a simple epicyclic train in which the deformable annulus is immobilized in rotation, while the axles of the planet wheels are mounted on a single plate fastened to the output shaft of the reducer.

According to a variant of the invention, the plate holding the planet wheel axles receives in turn at its center a drive gear for another reducer stage such as described above.

Advantageously, each planet turns by the intermediary of a bearing on a race which, by means of a hub, is centered with play about the axis of the planet, the hub receiving along a diameter of its boring a thin plate attached by its two ends to the boring and rigidly fastened at its center in a diametral slot of the planet wheel axle, the orientation of the slot parallel to the reducer axis being preferably essentially perpendicular to the radius from the center of the planet-holding plate and to the center of each planet axle.

Advantageously again, the thin plate has axial grooves which increase its flexibility without significantly decreasing its rigidity to traction and compression.

According to another embodiment of the invention, the planet-supporting hub and the planet axle are held together in their displacements with the help of radial grooves carried by one of the two elements while the other has radially oriented projections so that the planet wheel can be displaced only radially.

According to another embodiment of the invention, the bearing between a planet wheel and the race holding it is of the needle type which may be prestressed.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
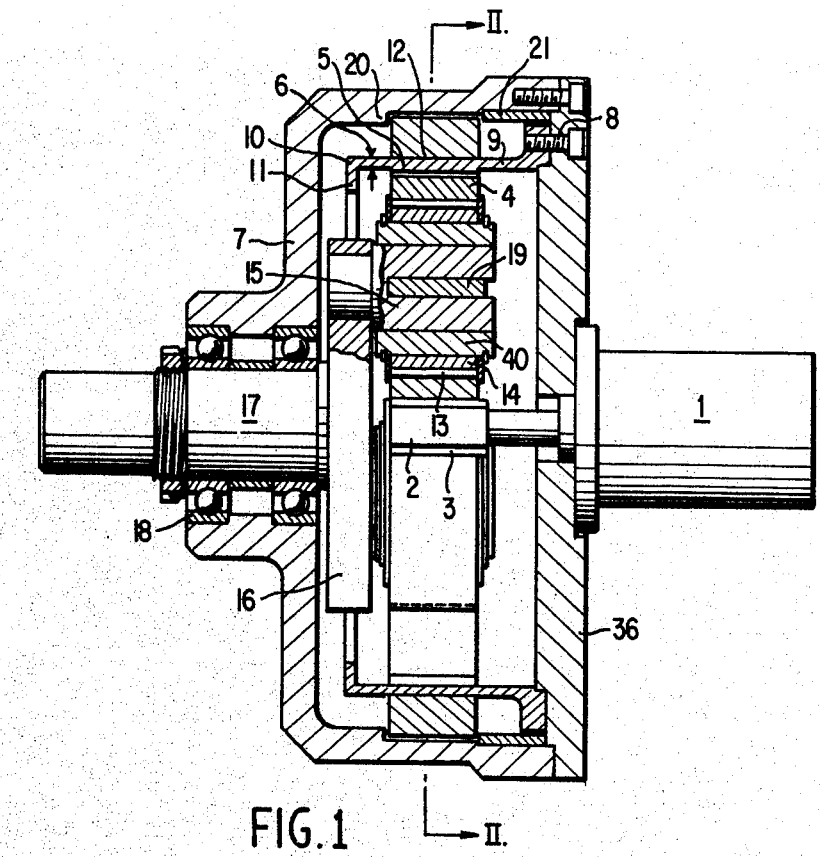
FIG. 1 is a representation in cross-section along the line I—I in FIG. 2 of the improved speed reducer of the present invention.
Figure 2:
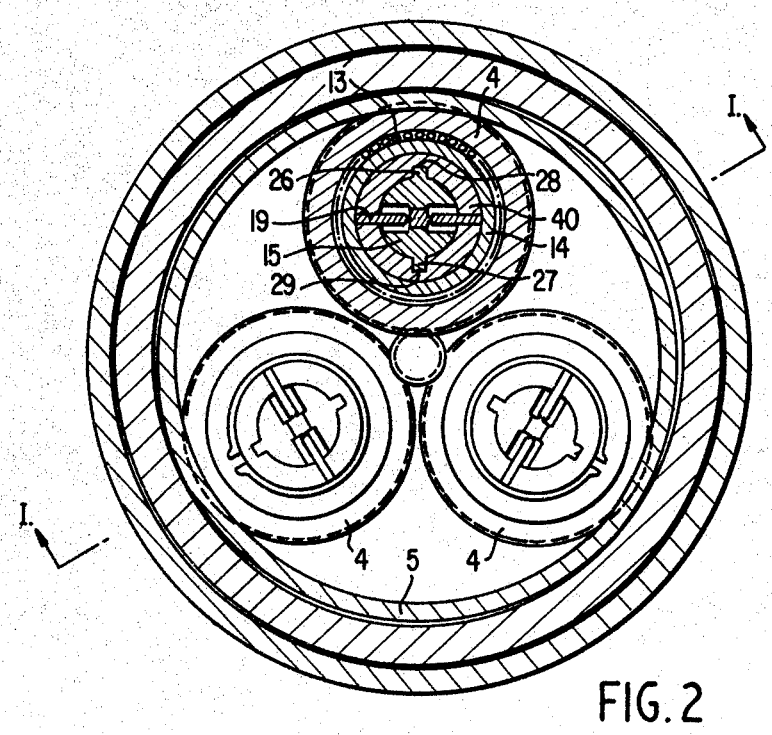
FIG. 2 is a representation in cross-section along the line II—II in FIG. 1 of the improved speed reducer of the present invention.

In the representation of FIG. 1, a motor 1 of arbitrary type drives a small diameter gear 2 with teeth 3. The gear may or may not be centered by bearings (not shown); i.e. it may or may not be integral with the motor shaft itself or may even be cut into the end of the motor shaft. The gear 2 drives in rotation at least two, and at most three planet wheels 4. One could, as will be seen below, use more than three planet wheels but this would not be without drawbacks. FIG. 2 shows the case of three planet wheels 4.

These planet wheels 4 mesh, in addition, with the inner teeth of an outer annulus 5 generally but not necessarily of steel. The latter has the peculiarity of being deformable when subjected to forces normal to its inner surface. This is achieved by selecting a sufficiently small thickness 6.

The annulus 5, moreover, is fixed and centered on the reducer housing 7 to which the motor 1 also is attached. In a variant, the annulus could be movable with respect to the housing 7 but could not rotate with respect to it. The diameter of the planet wheels 4 is such that, when they are in mesh with the drive gear 2, the circle circumscribing the pitch circles of the planet wheels 4 is larger than the pitch circle of the teeth of the annulus 5. The difference is several tenths of a millimeter. The teeth of the annulus 5 have a pitch circle diameter, measured at maximum and minimum points between the midpoint of the teeth of the annulus and the teeth roots, less than that of a circle, located from near the midpoint of the teeth to near the tip of the teeth, circumscribed about the planet gears in an operating position and engaging without play the gear teeth of the input shaft.

To assemble the epicyclic train of the invention, then, the annulus 5, which must be flexible, must be deformed. It is thus clear why there cannot be fewer than two planet wheels 4 since it is highly problematical that a satisfactorily operating reducer can thus be obtained and instead, strain wave type gearing would be used. Moreover, so that this deformation can be effected with small forces otherwise the teeth 3 of shaft 2 and the planet wheels 4 would be loaded heavily even in the absence of the input torque, it is apparent that the number of planet wheels must be small. In fact, for a large number of planet gears the deformation could not be achieved without significant increase in the circumference of the primitive circle of the teeth of annulus 5. Moreover, if there are more than three planets they must be of rather small diameter to avoid interference between them. The reduction ratio of the train described could not therefore be great. With three planet wheels there is a maximum ratio between the primitive diameter of the annulus 5 and that of the teeth 3 of the drive gear 2 of the order of ten.

It is understood then, that there can be no play in the epicyclic train just described. There would already appear to be several essential differences from "deformation wave" reducers. The drive being through a small diameter gear, the primary inertia is much lower. The deformation of the annulus 5 serves only to eliminate play while in deformation wave reducers and there must be no meshing with the fixed annulus except at the point normal to the large axis of the elliptical bearing. The ovalization of the bell of a "deformation wave" reducer is thus necessarily greater than double the height of a tooth, or several millimeters, whereas for the reducer of the invention, this deformation can be only some tenths of a millimeter. This difference makes the problem of material selection much less critical and diminishes the strains considerably.

For satisfactory performance of the reducer of the invention, the annulus 5 must be able to deform freely; a solution is illustrated in FIG. 1. Between the annulus 5 and its fastening 8 on a rigid mounting plate or cover 36 there is introduced a thin cylindrical part 9 long enough so that the annulus can expand without constraint from the fastening 8 which is a massive piece. If this were all, when the planet wheels deformed it, the annulus would tend to "funnel out" on the side opposite the fastening 8. To prevent this, the annulus 5 is prolonged by a thin cylindrical piece 10 of about the same length as the thin part 9 and which is eventually terminated by a flange 11 simulating the fastening 8, restoring symmetry. It suffices that the planet wheels have slightly convex teeth which are well-known and called "boat teeth" in the trade.

The deformation of the annulus 5 removes all play from the reducer train just described. However, this zero play can exist only under very small loads. For heavy loading, the radial reactions of the teeth due to their angle of compression would tend to expand the elastic annulus 5 still more. To avoid this, there is placed around the latter a thick, and thus very rigid, ring 12. The spacing between the annulus 5 and the inside of ring 12 can be as small as possible and thus limit the angular offset between the input shaft 2 and the output shaft 17. This limitation of the play can be achieved very simply, without requiring great precision in the parts and teeth.

In fact, after assembling the input shaft 2, planet wheels 4 and annulus 5 it suffices to measure the outer diameter of the last. The inner diameter of the ring 12 is then machined to be greater by some hundredths of a millimeter on each side. The rigid ring 12 is mounted floatingly about the deformable annulus 5. Its axial displacement is limited on one side by a shoulder 20 of housing 7 and on the other by a brace 21 visible in FIG. 1.

For effective suppression of this play discussed above it is indispensable that the planet wheels 4 be able to be pressed against the drive gear 2, i.e. that the interaxes of the planets 4 must be able to adapt. To this end, each planet wheel 4 rotates preferably by the intermediary of needles 13 on a race 14 shrunk on a concentric hub 40 with an axial part 15 of as large a diameter as possible so as to be very rigid and mounted on a plate 16 integral with the output shaft 17 which can be attached directly to the driven device, not shown, or rotate by the intermediary of bearings 18 in the housing 7 of the reducer. To give the reducer high torsional rigidity, it is necessary that the junction between the race 14 holding the planet wheel 4 and the axial part 15 be as rigid as possible in a tangential direction while allowing the race 14 to move very easily radially under the action of the radial force exerted by the annulus 5 when it is deformed. A preferred solution is described below.

Figure 3:
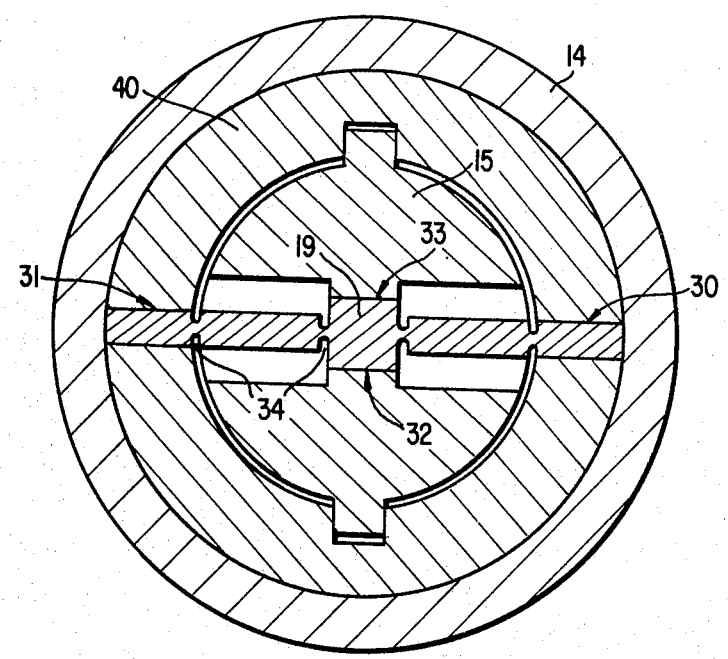
FIG. 3 is an enlarged representation in cross-section along a plane perpendicular to its axis of rotation of a first mode of realization of a planet wheel used in the realization of the improved speed reducers of the present invention.

The hub 40 is joined to the axial part 15 by a thin plate 19. The plate 19 is welded or brazed at each end to the hub 40 and it is likewise welded or brazed at its center in a slot in the axial part 15 as is seen in FIGS. 2 and 3. Plate 19 is oriented perpendicular to the radius from the center of the drive shaft 2 to the center of the axial part 15. Accordingly, when the reducer transmits a torque, the plate 19 works in traction and compression and its cross-section must be such that the torsional rigidity of the reducer is high.

Modes of realizing the plate 19 are described below. When the planet wheel 4 receives a radial force from the annulus 5, the plate 19 works in flexure. It can be very flexible and so the friction torque transmitted by the needles 13 could be enough to cause a non-negligible torsion of the race 14 with respect to the axial part 15. Though this might not be detrimental to the rigidity and good performance of the reducer, the stress in the plate 19 would be uselessly increased by it. A means of avoiding this is illustrated in FIG. 2. The axial part 15 has two projections 26 and 27 which slide in two corresponding grooves 28 and 29 in the hub 40 with a slight play. In this way no significant torsion of the race 14 can be produced, the play being still sufficient for all the torque of the reducer to be transmitted by the plate 19.

FIG. 3 shows a preferred mode of realization of the plate 19. This is formed from a thick plate brazed or welded at its ends in two grooves 30 and 31 in the hub 40 and at its middle 32 in a slot 33 in the axial part 15. For the rest of the plate 19 there is play between it and the slot 33. Moreover, the free parts of the plate 19 have transverse slots 34 which locally produce a sufficiently small thickness for the torque transmitted by the reducer not to create excessive strains in the small sections of the plate 19. The grooves 34 give the planet wheel 4 the necessary radial flexibility without significantly modifying the rigidity of the plate 19 to traction, and thus the torsional rigidity of the reducer.

If it is desired to realize a reducer with a large ratio, several trains of the type just described are mounted in series. A particularly advantageous realization is that of FIG. 4. In it have been combined two planetary trains of which only the output train is for removing play. In effect, because of the double multiplication, the play in the first train, seen from the output shaft, is very small. The fixed annulus 35 of the first epicyclic train is attached to the cover 36 in the same way as the housing 7.

The deformable annulus 5 of the second train is fastened to the annulus 35 and with the help of the same bolts. The planet wheel holding plate 37 of the first train receives the drive gear 2 of the second train. There is no need to recenter the plate 37 since it is centered by the shaft 2 if the second train has three planet wheels. In the contrary case a centering arrangement is needed. Of course, if the first train is realized with no arrangement for removing play, it must be of a precision, along with all the other parts of the train, compatible with its good operation. The plate 37 need only be restrained axially. This can be done in many ways.

The invention is applicable to numerous types of mechanisms and in particular to numerous types of epicyclic reducers. The preceding description is that of the preferred realization which allows for the following desired qualities:

the primary inertia of the reducer of the invention is very low. To be more precise, it is of the order of 100 times, or more, smaller than that of a "deformation wave" reducer and even less than that of a reducer with pairs of gears;

the capacity of the reducer of the invention is equal to that of the best standard epicyclic reducers. Its mass is low which makes it advantageous to use in "shipboard" devices;

for relatively low or medium values of torque, the play of the reducer is rigorously zero;

for the maximum torque, the play is extremely small. Moreover, it is easily adjustable without modification of the components with the exception of a simple cylindrical piece and without necessitating very high precision in the interaxes and the gear teeth;

as a consequence of the preceding advantage, the cost of the reducer is low in relation to its capacity, and, the reducer of the invention has a torsional stiffness comparable to that of a standard reducer and therefore better than that of a "deformation wave" reducer.

Other useful characteristics can easily be incorporated in the reducer of the invention. For example, it has been seen that the planet wheel 4 is mounted on the race 14 by the intermediary of needles 13. This mounting is particularly advantageous since the needles have a very large load capacity along with very low radial space consumption. However, needle bearings in general have a certain small amount of play; according to the invention, they can be preloaded thanks to the thinness of the race 14 and/or the ring gear forming the planet wheel 4.

Figure 4:
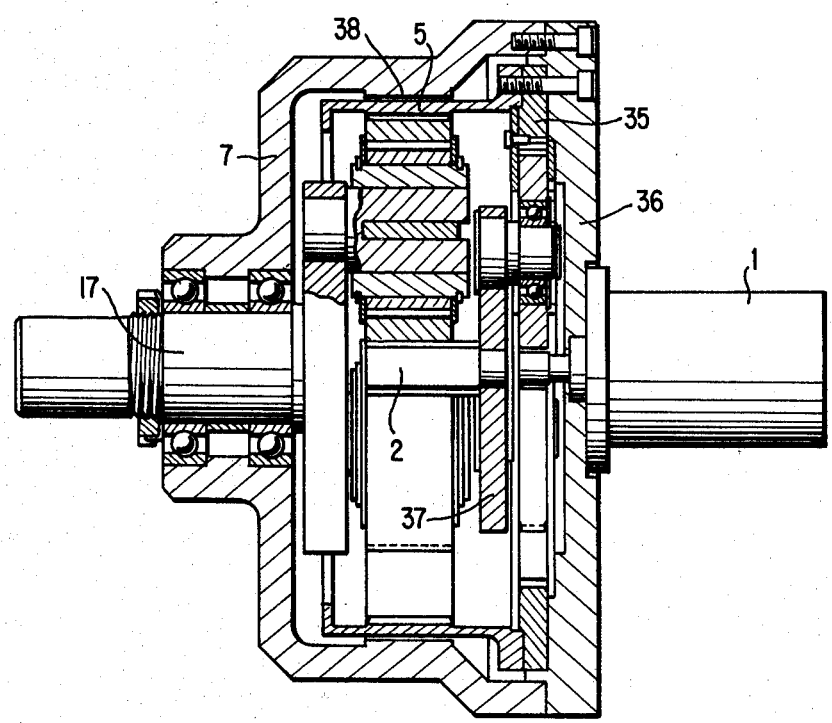
FIG. 4 is a representation in cross-section along the line I—I in FIG. 2 of an improved speed reducer with several stages as in the present invention.

The ring 12 limiting the deflection of the elastic annulus 5 can be formed, as shown in FIG. 4, by a boring 38 in the reducer housing 7, which eliminates the need for restraining the ring 12 axially. However, the preferred construction is still a ring 12 separate from the housing 7 and mounted with clearance inside the latter.

The teeth of the annulus 5 and/or those of the planet wheels 4 and/or the teeth 3 of the shaft 2 are of the boat type as mentioned above but their profile is advantageously corrected or modified so as to produce a progressive loading of the teeth and avoid loads on the ends of the teeth at the time of initial contact. The teeth are also preferably at a large angle to the force, thus increasing the torque capacity of the reducer and they may also be of the type with non conjugate profiles or any other type without going beyond the bounds of the present invention. The reducer described can also serve well as a speed multiplier.

Figure 5:
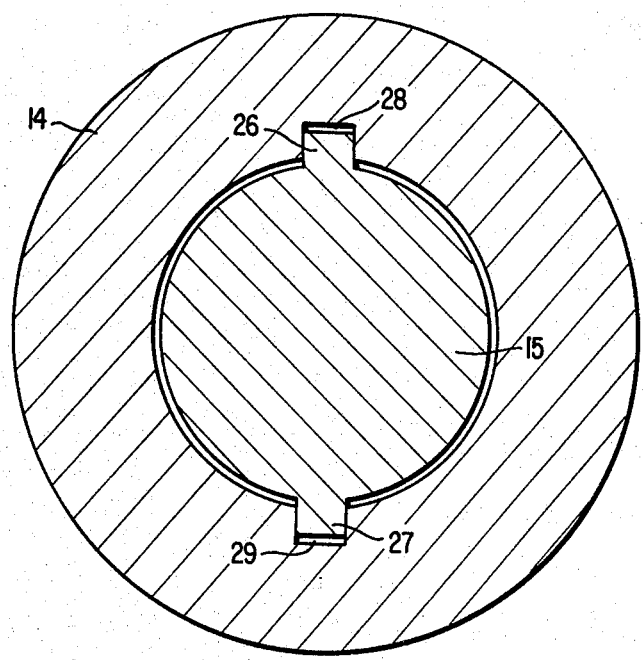
FIG. 5 is an enlarged representation in cross-section in a plane perpendicular to its axis of rotation of a second mode of realization of a planet wheel used in the realization of the improved speed reducer of the present invention.

FIG. 5 shows, finally, a simpler mode of realizing a planet wheel 4. Here the axial part 15 is provided merely with tenons 26 and 27 and the race 14 just has grooves 28 and 29. Still other modes of mating axial part 15 and race 14 can easily be thought up.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A speed reducer mechanism which comprises:
   an input shaft;
   gear teeth disposed on said input shaft;
   at least two and at most three planet gears disposed adjacent to and directly driven by said gear teeth; and
   a radially deformable annulus including teeth, driven by said planet gears, with an axis concentric with the axis of the input shaft, the teeth of the annulus having a pitch circle diameter, measured at maximum and minimum points between the midpoint of the teeth of the annulus and the teeth roots, less than that of a circle, located from near the midpoint of the teeth to near the tip of the teeth, circumscribed about said planet gears in an operating position and engaging without play the gear teeth of the input shaft, the deformable annulus serving to urge the planet gears inwardly against the input shaft gear teeth to remove play in the reducer gear train, and the difference in diameter of the pitch circles of the teeth of the annulus and the planet gear ensuring that the meshing will be without play for the life of the speed reducer.

2. A speed reducer as set forth in claim 1, which further comprises:
   a rigid ring mounted around the deformable annulus, of inner diameter greater by hundredths of a millimeter than that of the circle circumscribed about the radially deformable annulus after said radially deformable annulus has been mounted around the planet gears surrounding the input shaft.

3. A speed reducer as set forth in claim 2, which further comprises:
   a housing within which said rigid ring is disposed, including a shoulder member;
   a brace also disposed within said housing;
   said rigid ring being floatingly mounted about the radially deformable annulus and wherein the axial displacement of said rigid ring is limited on one side by said shoulder member of said housing and on the other side by said brace.

4. A speed reducer as set forth in claim 2, which further comprises;
   a rigid mounting plate, to which said radially deformable annulus is attached, for receiving torque resulting from torque applied to the input shaft by the intermediary of a rigid centering element and the rigid mounting plate; and,
   a first thin-walled cylindrical part, interconnecting said radially deformable annulus and said rigid mounting plate, long enough to permit said radially deformable annulus to deform radially without hindrance.

5. A speed reducer as set forth in claim 4, which further comprises:
   a second thin cylindrical part extending from said radially deformable annulus on a side opposite said first cylindrical part, said second cylindrical part including a flange and being of such a length that in response to a radial force from the planet gears, the deformation of said radially deformable annulus being essentially symmetric with respect to a plane perpendicular to the axes of the planet gears and passing through the middle of their thickness.

6. A speed reducer as set forth in claim 4, which further comprises;
   an output shaft and an end plate mounted thereon wherein the input shaft, the planet gears and the radially deformable annulus forming a epicyclic train in which the radially deformable annulus is immobilized in rotation and wherein the axes of the planet gears are attached to said plate.

7. A speed reducer as set forth in claim 6, wherein;
   the deformable annulus is kept from rotating by the member receiving the resultant torque of the torque applied by the input shaft and is not centered, and wherein centering of the train is realized by the boring of the rigid ring which is itself centered.

8. A speed reducer as set forth in claim 6, further comprising; a plurality of bearing members wherein the deformable annulus is kept from rotating by the rigid mounting plate receiving the resultant torque applied by the input shaft and is not centered, and wherein the centering of the train is realized by the input shaft which is centered by said bearing members.

9. A speed reducer as set forth in claim 1, which further comprises:
a plate receiving the axes of the planet gears wherein the plate receives at its center a drive gear for another reducer element.

10. A speed reducer as set forth in claim 1 wherein;
each of said planet gears includes means permitting said planet gears to shift with respect to an axial part thereof, mountably held by a planet-supporting plate in a radial direction so that said planet gears can make contact without play with the gear teeth of the input shaft under the action of forces exerted by the radially deformable annulus.

11. A speed reducer as set forth in claim 8, wherein;
each planet gear is rotatably supported by a bearing on a race which by the intermediary of a hub disposed within the race is centered with play about the axial part of each planet gear and includes means permitting the hub to shift with respect to the axial part which comprises a thin plate fastened at its two ends in a boring provided along a diameter of said hub and is fastened at its center in a diametrical slot provided in said axial part of the planet gear and wherein said diametrical slot is parallel to the axis of the reducer and is essentially perpendicular to the radius from the center of the planet supporting plate to the center of said axial part.

12. A speed reducer as set forth in claim 9, wherein;
said thin plate includes transverse grooves disposed therein, essentially parallel to the axis of the planet gears.

13. A speed reducer as set forth in claim 9 wherein;
the bearing, situated between the planet wheel and the race receiving it, is of a needle type which can be preloaded.

14. A speed reducer as set forth in claim 8, characterized by the fact that means permitting the displacement between the planet-holding hub and the axial part of the planet gear comprises, in addition, radial grooves on said hub while the axial part has radially oriented tenons.

* * * * *